(12) United States Patent
Lee

(10) Patent No.: US 7,237,130 B2
(45) Date of Patent: Jun. 26, 2007

(54) BLADE SERVER PERFORMANCE MANAGEMENT METHOD AND SYSTEM

(75) Inventor: Chun-Liang Lee, Taipei (TW)

(73) Assignee: Inventec Corporation, Shih-Lin District, Taipei (TW)

( * ) Notice: Subject to any disclaimer, the term of this patent is extended or adjusted under 35 U.S.C. 154(b) by 467 days.

(21) Appl. No.: 10/633,892

(22) Filed: Aug. 4, 2003

(65) Prior Publication Data

US 2005/0034000 A1 Feb. 10, 2005

(51) Int. Cl.
*G06F 1/32* (2006.01)

(52) U.S. Cl. .................. 713/323; 713/324; 713/340

(58) Field of Classification Search .............. None
See application file for complete search history.

(56) References Cited

U.S. PATENT DOCUMENTS

| | | | | |
|---|---|---|---|---|
| 5,842,027 A | * | 11/1998 | Oprescu et al. | 713/300 |
| 6,785,827 B2 | * | 8/2004 | Layton et al. | 713/300 |
| 6,859,882 B2 | * | 2/2005 | Fung | 713/300 |
| 6,968,470 B2 | * | 11/2005 | Larson et al. | 713/340 |

* cited by examiner

*Primary Examiner*—Thuan Du
(74) *Attorney, Agent, or Firm*—Fulbright & Jaworski, LLP

(57) ABSTRACT

A blade server performance management method and system is proposed, which is designed for use with a blade server including a cluster of server modules to provide a performance management function on the clustered server modules with the purpose of allowing all the clustered server modules in the blade server to have sufficient power load to operate normally as well as protecting each of the clustered server modules from being burned out due to an overly high working temperature during high-performance operation.

16 Claims, 2 Drawing Sheets

BLADE SERVER PERFORMANCE MANAGEMENT METHOD AND SYSTEM

BACKGROUND OF THE INVENTION

1. Field of the Invention

This invention relates to computer network server technology, and more particularly, to a blade server performance management method and system, which is designed for use with a blade server including a cluster of server modules to provide a performance management function on the clustered server modules with the purpose of allowing all the clustered server modules to have sufficient power load to operate normally as well as protecting each of the clustered server modules from being burned out due to an overly high working temperature during high-performance operation.

2. Description of Related Art

Blade server is a clustering type of network server, which is characterized by the use of a circuit board enclosure to integrate a cluster of server modules (commonly called "blades"), with all of these server modules providing the same server function. In other words, a blade server can respond to a client's request by linking any one of the clustered server modules to the client. In practice, each server module is embodied as a single circuit board (i.e., blade), which can be easily fitted to the blade server's enclosure to increase the blade server's client serving capacity.

Fundamentally, each of the clustered server modules in a blade server is equipped with one or more CPUs (Central Processing Unit) for independent data processing, and each CPU typically comes with two or more operating modes of different performance levels that can be arbitrarily set by system or user to provide different data processing speeds. Different models of CPUs may offer different operating modes. For example, a certain type of CPU offers two operating modes, respectively called automatic mode and on-demand mode, wherein the automatic mode is higher in performance level than the on-demand mode; and another type of CPU offers two operating modes, respectively called automatic mode and throttling mode, wherein the automatic mode is higher in performance level than the throttling mode. Fundamentally, a high level of operating mode would provide a higher processing speed, but would notwithstanding consume more electrical power and cause higher working temperature in the CPU.

In application, the clustered server modules in blade server are typically set to different CPU operating modes, so that some of them can provide higher data serving capacity and speed. However, since a server module with a higher CPU performance level also has a higher rate of power consumption, it may cause other server modules with a lower CPU performance to be underpowered and thus unable to operate normally.

Moreover, since a server module with a higher CPU performance level consumes more electrical power, it would lead to a higher working temperature during operation. When a server module's CPU working temperature exceeds an overheating limit, it could cause the server module's CPU to burn out and thus fail to operate normally.

SUMMARY OF THE INVENTION

It is therefore an objective of this invention to provide a blade server performance management method and system that allows all of the clustered server modules in a blade server to have sufficient power load to operate normally.

It is another objective of this invention to provide a blade server performance management method and system that can protect high-performance server modules in a blade server from being burned out due to an overly high working temperature.

The blade server performance management method and system according to the invention is designed for use with a blade server including a cluster of server modules, each server module having at least two different operating modes, for providing a performance management function on the clustered server modules in the blade server.

The blade server performance management method and system according to the invention is based on the method steps of: performing a power-load detecting procedure to detect the current distribution of power load by the power supply of the blade server to the clustered server modules in the blade server; if the current distribution of power load to the clustered server modules is below a rated power level, performing an operating mode inspecting procedure to inspect the current operating modes of the server modules to find the highest-performance server module; and performing a power-initiated operating mode adjusting procedure to switch the highest-performance server module to a lower level of operating mode.

The blade server performance management method and system according to the invention allow each of the clustered server modules in the blade server to have sufficient power load to operate normally as well as to protect each of the clustered server modules from being burned out due to an overly high working temperature during high-performance operation. The blade server performance management method and system according to the invention is therefore advantageous to use.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The blade server performance management method and system according to the invention is disclosed in full details by way of preferred embodiments in the following with reference to the accompanying drawings.

Figure 1:
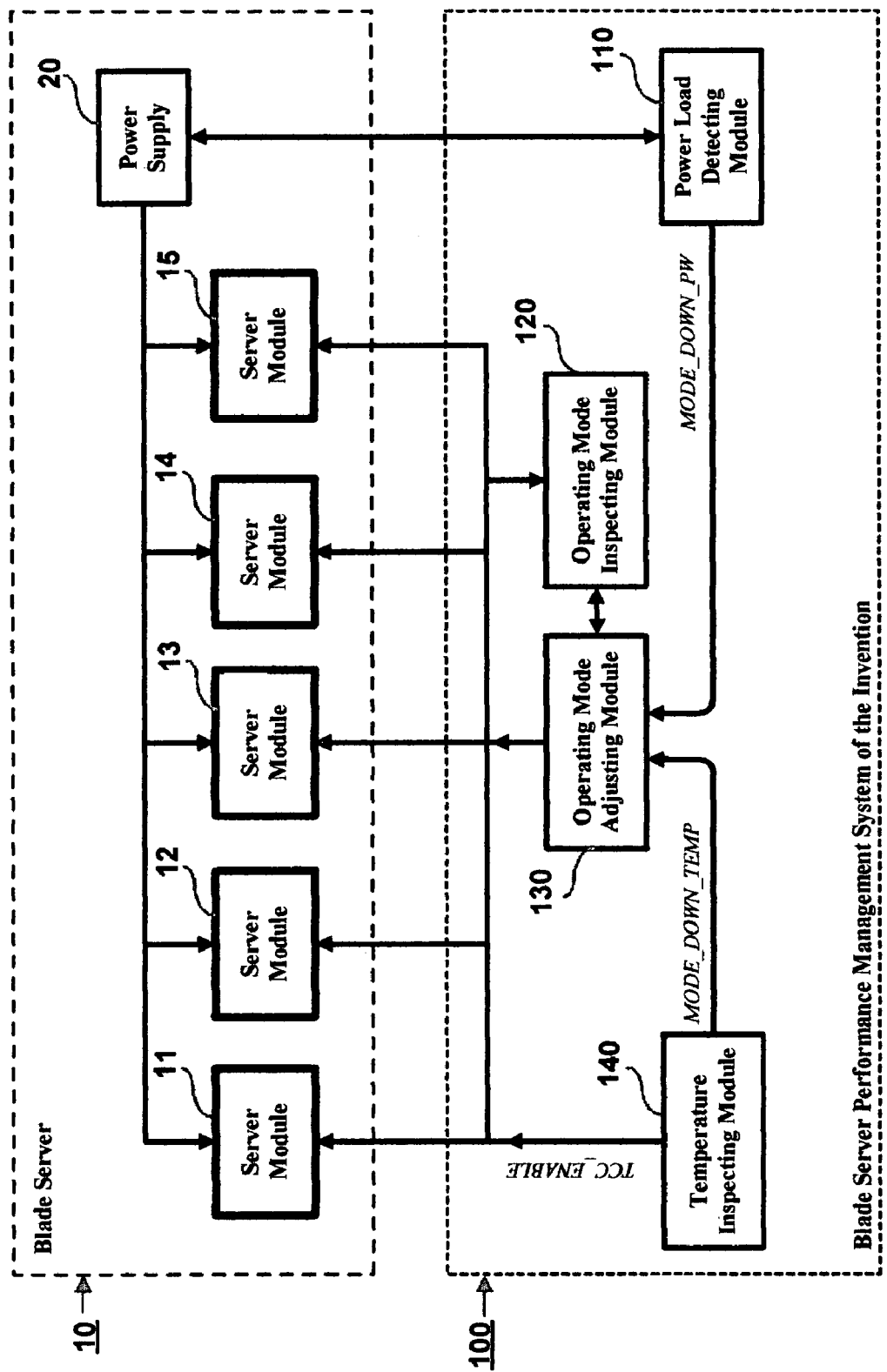
FIG. 1 is a schematic diagram showing an object-oriented component model of the blade server performance management system according to the invention.

FIG. 1 is a schematic diagram showing the object-oriented component model of the blade server performance management system (as the part enclosed in the dotted box indicated by the reference numeral 100). As shown, in application, the blade server performance management system of the invention 100 is integrated to a blade server 10 which includes a cluster of server modules (commonly called "blades"), for example 5 server modules 11, 12, 13, 14, 15 (note that 5 server modules are shown here only for demonstrative purpose, and in practice, the blade server 10 may include any number of server modules). The server modules 11, 12, 13, 14, 15 each include one or more CPUs (not shown) for data processing, and each CPU comes with two or more operating modes of different performance levels that can be arbitrarily set by system or user to provide different data processing speeds.

The CPU operating modes available in the server modules 11, 12, 13, 14, 15 may be different in different models. For example, a certain type of CPU may offer two operating modes, respectively called automatic mode and on-demand mode, wherein the automatic mode is higher in performance level than the on-demand mode; and another type of CPU may offer two operating modes, respectively called automatic mode and throttling mode, wherein the automatic mode is higher in performance level than the throttling mode. Fundamentally, a higher level of operating mode would provide a higher processing speed, but would notwithstanding consume more electrical power and cause higher working temperature in the CPU.

In application, the clustered server modules 11, 12, 13, 14, 15 in the blade server 10 are typically set to different CPU operating modes, so that some of them can provide higher data serving capacity and speed. For example, the first two server modules 11, 12 can be set to automatic modes, while the next two server modules 13, 14 are set to on-demand modes and the last server module 15 is set to throttling mode.

The object-oriented component model of the blade server performance management system of the invention 100 comprises: (a) a power-load detecting module 110; (b) a operating mode inspecting module 120; and (c) an operating mode adjusting module 130; and further comprises a temperature inspecting module 140.

The power-load detecting module 110 is capable of detecting whether the current distribution of power load by the power supply 20 of the blade server 10 to the clustered server modules 11, 12, 13, 14, 15 in the blade server 20 is below a rated power level; and if YES, the power-load detecting module 110 will promptly issue a power-initiated mode down request MODE_DOWN_PW to the operating mode adjusting module 130.

The operating mode inspecting module 120 is capable of inspecting what operating mode is currently being set to each of the clustered server modules 11, 12, 13, 14, 15 in the blade server 10 to find which one or ones are currently being set in the highest-level of operating mode. The inspected information is then transferred to the operating mode adjusting module 130.

The operating mode adjusting module 130 is capable of being activated in response to the mode down request MODE_DOWN_PW from the power-load detecting module 110 and based on the inspected information from the operating mode inspecting module 120 to adjust the operating mode of the highest-performance one of the server modules 11, 12, 13, 14, 15 in the blade server 10 to a lower level of operating mode (if two or more server modules are operating at the same highest-level of operating mode, then one of them is selected). For example, if the highest-performance server module is currently set in automatic mode, then its operating mode is switched to on-demand mode or throttling mode which is a low-performance operating mode. After this, the power-load detecting module 110 will continue to detect whether the subsequent distribution of power load by the power supply 20 of the blade server 10 to the clustered server modules 11, 12, 13, 14, 15 in the blade server 20 is above the rated power level; and if still below, the power-load detecting module 110 will issue another mode down request MODE_DOWN_PW to the operating mode adjusting module 130 to activate the operating mode adjusting module 130 to switch another highest-performance server module to a lower level of operating mode. This procedure will be repeated until the power-load detecting module 110 detects that the distribution of power load by the power supply 20 of the blade server 10 to the clustered server modules 11, 12, 13, 14, 15 in the blade server 20 is above the rated power level.

The temperature inspecting module 140 is capable of inspecting whether the current working temperature of any one of the clustered server modules 11, 12, 13, 14, 15 in the blade server 10 is below an overheating limit; and if one or more server module are above the overheating limit, the temperature inspecting module 140 will promptly initiate a temperature lowering procedure by issuing a temperature-initiated mode down request MODE_DOWN_TEMP to the operating mode adjusting module 130 to activate the operating mode adjusting module 130 to switch the currently overheated server module(s) to a lower level of operating mode. After this, the temperature inspecting module 140 will continue to inspect the subsequent working temperature of the previously overheated server module to see if it is now below the overheating limit; and if still not, the temperature inspecting module 140 will activate the operating mode adjusting module 130 to further adjust the overheated server module to a still lower level of operating mode (if available). This procedure will be repeated until the working temperature of the overheated server module is below the overheating limit. Alternatively, in another preferred embodiment, the temperature inspecting module 140 can directly issue a TCC enable signal TCC_ENABLE to the overheated server module to activate the CPU on the overheated server module to perform a built-in TCC (Thermal Control Circuit) procedure to lower its working temperature by reducing performance, such as by reducing the duty cycles of the CPU clock signal to 30%-50%.

Figure 2:
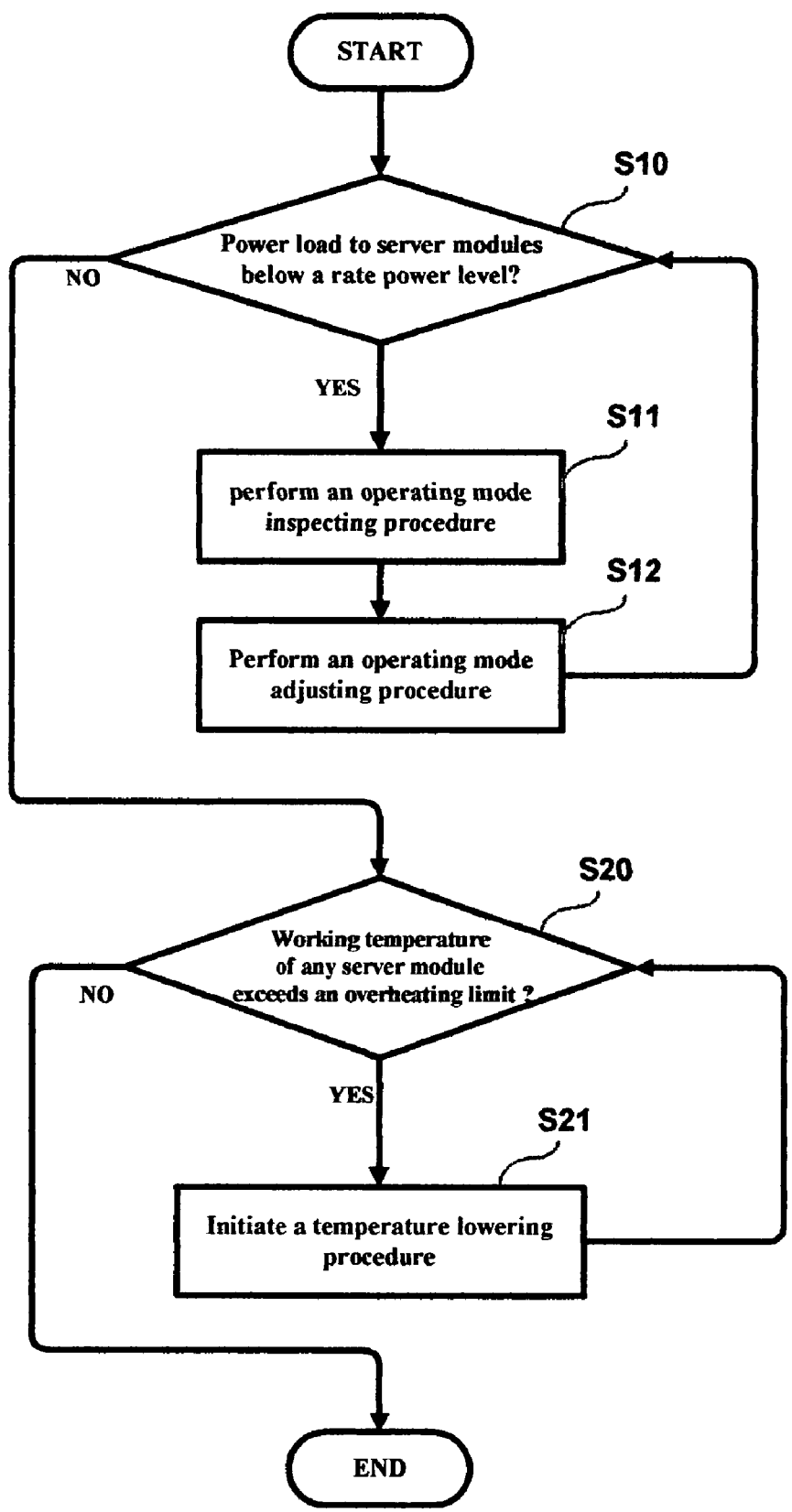
FIG. 2 is a flow diagram showing the method steps performed by the blade server performance management system according to the invention.

FIG. 2 is a flow diagram showing the method steps performed by the blade server performance management system of the invention 100 during operation.

Referring to FIG. 2 together with FIG. 1, the initial step S10 is to perform a power-load detecting procedure, wherein the power-load detecting module 110 is activated to detect whether the current distribution of power load by the power supply 20 of the blade server 10 to the clustered server modules 11, 12, 13, 14, 15 in the blade server 20 is below a rated power level; If YES, the power-load detecting module 110 promptly issues a mode down request MODE_DOWN_PW to the operating mode adjusting module 130, and the procedure goes to the next step S11.

The next step S11 is to perform an operating mode inspecting procedure, wherein the operating mode inspecting module 120 is activated to inspect what operating mode is currently being set to each of the server modules 11, 12, 13, 14, 15 in the blade server 10 to find which one or ones are currently being set in the highest-level of operating mode, and then transfer the inspected information to the operating mode adjusting module 130. The procedure then goes to the step S12.

In the step S12, an operating mode adjusting procedure is performed, wherein the operating mode adjusting module 130 is activated in response to the mode down request MODE_DOWN_PW from the power-load detecting module 110 and based on the inspected information from the operating mode inspecting module 120 to switch the highest performance server module to a lower level of operating mode (if two or more server modules are operating in the same highest-level of operating mode, then one of them is selected). For example, if the highest-performance server module is currently operating in automatic mode, then its operating mode is switched to on-demand mode or throttling mode which is a lower level of operating mode.

After the task of step S12 is completed, the procedure goes back to the previous step S10 to repeat the power-load detecting procedure, wherein the power-load detecting module 110 continues to detect whether the subsequent distribution of power load by the power supply 20 of the blade server 10 to the clustered server modules 11, 12, 13, 14, 15 in the blade server 20 is above the rated power level; and if still below, the steps S11-S12 are repeated again. The looped steps S10-S12 are repeated until the power-load detecting module 110 detects that the distribution of power load by the power supply 20 of the blade server 10 to the clustered server modules 11, 12, 13, 14, 15 in the blade server 20 is above the rated power level.

As the power load to all of the clustered server modules 11, 12, 13, 14, 15 in the blade server 10 is sufficient, the procedure then goes to the step S20 to perform a temperature inspecting procedure, wherein the temperature inspecting module 140 is activated to inspect whether the current working temperature of any one of the server modules 11, 12, 13, 14, 15 exceeds an overheating limit; if NO, the procedure is ended; whereas if YES, the procedure goes to the step S21.

In the step S21, a temperature lowering procedure is initiated with the purpose of lowering the working temperature of the overheated server module(s). This temperature lowering procedure has two different embodiments.

By the first embodiment, the temperature inspecting module 140 is activated to issue a mode down request MODE_DOWN_TEMP to the operating mode adjusting module 130 to activate the operating mode adjusting module 130 to switch the overheated server module(s) to a lower level of operating mode. After this, the temperature inspecting module 140 will continue to inspect the subsequent working temperature of the previously overheated server module to see if it is now below the overheating limit; and if still not, the temperature inspecting module 140 will activate the operating mode adjusting module 130 to switch the overheated server module to a still lower level of operating mode (if available). This procedure will be repeated until the working temperature of the overheated server module is below the overheating limit.

By the second embodiment, the temperature inspecting module 140 directly issues a TCC enable signal TCC_ENABLE to the overheated server module to activate the overheated server module to perform a built-in TCC (Thermal Control Circuit) procedure to lower its working temperature by reducing performance, such as by reducing the duty cycles of the CPU clock signal to 30%-50%.

After the task of step S21 is completed, the procedure goes back to the previous step S20 to repeat the temperature inspecting procedure, wherein the temperature inspecting module 140 continues to inspect whether the subsequent working temperature of the previously overheated server module(s) still exceeds the overheating limit; if NO, the procedure is ended; whereas if YES, the procedure goes to the step S21 to repeat the temperature lowering procedure again. The looped steps S20-S21 are repeated until the temperature inspecting module 140 inspects that the subsequent working temperature of the previously overheated server module(s) is below the overheating limit.

In conclusion, the invention provides a blade server performance management method and system, which is designed for use with a blade server including a cluster of server modules to provide a performance management function on the clustered server modules in the blade server so as to allow all the clustered server modules in the blade server to have sufficient power load to operate normally as well as to protect each of the clustered server modules from being burned out due to an overly high working temperature during high-performance operation. The blade server performance management method and system according to the invention is therefore advantageous to use.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A blade server performance management method for use on a blade server including a cluster of server modules, each server module being capable of offering at least two different operating modes, for providing a performance management function on the clustered server modules in the blade server;

the blade server performance management method comprising:

performing a power-load detecting procedure to detect a current distribution of power load by a power supply of the blade server to the clustered server modules in the blade server;

if the current distribution of power load to the clustered server modules is below a rated power level, performing an operating mode inspecting procedure to inspect current operating modes of the server modules to find a highest-performance server module; and performing a power-initiated operating mode adjusting procedure to switch the highest-performance server module to a lower level of operating mode.

2. The blade server performance management method of claim 1, further comprising:

performing a temperature inspecting procedure to inspect whether a current working temperature of each of the server modules in the blade server is below an overheating limit;

if NO, performing a temperature-initiated operating mode adjusting procedure to switch an overheated server module to a lower level of operating mode.

3. The blade server performance management method of claim 2, wherein the temperature-initiated operating mode adjusting procedure is carried out by activating the overheated server module to perform a TCC procedure to lower its working temperature by reducing performance.

4. The blade server performance management method of claim 1, wherein the operating modes of the clustered server modules include an automatic mode and an on-demand mode, wherein the on-demand mode is lower in performance than the automatic mode.

5. The blade server performance management method of claim 1, wherein the operating modes of the clustered server modules include an automatic mode and a throttling mode, wherein the throttling mode is lower in performance than the automatic mode.

6. A blade server performance management system for use with a blade server including a cluster of server modules, each server module being capable of offering at least two different operating modes, for providing a performance management function on the clustered server modules in the blade server the blade server performance management system comprising:
- a power-load detecting module, which is capable of detecting whether a current distribution of power load by a power supply of the blade server to the clustered server modules in the blade server is below a rated power level, and if yes, capable of issuing a power-initiated mode down request;
- an operating mode inspecting module, which is capable of inspecting what operating mode is currently being set to each of the clustered server modules in the blade server to find a highest-performance one of the server modules; and
- an operating mode adjusting module, which is capable of being activated in response to the power-initiated mode down request from the power-load detecting module and based on the inspected information from the operating mode inspecting module to switch the highest-performance server module to a lower level of operating mode.

7. The blade server performance management system of claim 6, further comprising:
- a temperature inspecting module, which is capable of inspecting whether a current working temperature of each of the clustered server modules in the blade server is below an overheating limit; and if NO, capable of initiating a temperature lowering procedure to lower the working temperature of an overheated server module by switching the overheated server module to a lower level of operating mode.

8. The blade server performance management system of claim 7, wherein in the temperature lowering procedure, the temperature inspecting module issues a temperature initiated mode down request to the operating mode adjusting module to activate the operating mode adjusting module to adjust the overheated server module to a lower level of operating mode.

9. The blade server performance management system of claim 7, wherein in the temperature lowering procedure, the temperature inspecting module issues a TCC enable message to the overheated server module to activate the overheated server module to perform a built-in TCC procedure to lower its working temperature by reducing performance.

10. The blade server performance management system of claim 6, wherein the operating modes of the clustered server modules include an automatic mode and an on-demand mode, wherein the on-demand mode is lower in performance than the automatic mode.

11. The blade server performance management system of claim 6, wherein the operating modes of the clustered server modules include an automatic mode and a throttling mode, wherein the throttling mode is lower in performance than the automatic mode.

12. A blade server performance management system for use with a blade server including a cluster of server modules, each server module being capable of offering at least two different operating modes, for providing a performance management function on the clustered server modules in the blade server;

the blade server performance management system comprising:
- a power-load detecting module, which is capable of detecting whether a current distribution of power load by a power supply of the blade server to the clustered server modules in the blade server is below a rated power level, and if yes, capable of issuing a power-initiated mode down request;
- an operating mode inspecting module, which is capable of inspecting what operating mode is currently being set to each of the clustered server modules in the blade server to find a highest-performance one of the server modules;
- an operating mode adjusting module, which is capable of being activated in response to the power-initiated mode down request from the power-load detecting module and based on the inspected information from the operating mode inspecting module to switch the highest-performance server module to a lower level of operating mode; and
- a temperature inspecting module, which is capable of inspecting whether a current working temperature of each of the clustered server modules in the blade server is below an overheating limit; and if NO, capable of initiating a temperature lowering procedure to lower the working temperature of an overheated server module by switching the overheated server module to a lower level of operating mode.

13. The blade server performance management system of claim 12, wherein in the temperature lowering procedure, the temperature inspecting module issues a temperature initiated mode down request to the operating mode adjusting module to activate the operating mode adjusting module to adjust the overheated server module to a lower level of operating mode.

14. The blade server performance management system of claim 12, wherein in the temperature lowering procedure, the temperature inspecting module issues a TCC enable message to the overheated server module to activate the overheated server module to perform a built-in TCC procedure to lower its working temperature by reducing performance.

15. The blade server performance management system of claim 12, wherein the operating modes of the clustered server modules include an automatic mode and an on-demand mode, wherein the on-demand mode is lower in performance than the automatic mode.

16. The blade server performance management system of claim 12, wherein the operating modes of the clustered server modules include an automatic mode and a throttling mode, wherein the throttling mode is lower in performance than the automatic mode.

* * * * *